United States Patent
Dong et al.

(10) Patent No.: US 9,722,355 B1
(45) Date of Patent: Aug. 1, 2017

(54) NOTEBOOK, LAPTOP OR PORTABLE COMPUTER POWER ADAPTER WITH SECURITY LOCK

(71) Applicant: International Business Machines Corporation, Armonk, NY (US)

(72) Inventors: Xingquan Dong, Shanghai (CH); Zhao Lin, Nanshan (CH); Licen Mu, Shenzhen (CH); Qiuyi Yu, Shenzhen (CH); Weifeng Zhang, Shenzhen (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 11 days.

(21) Appl. No.: 14/994,558

(22) Filed: Jan. 13, 2016

(51) Int. Cl.
*H01R 13/639* (2006.01)

(52) U.S. Cl.
CPC .................. *H01R 13/639* (2013.01)

(58) Field of Classification Search
CPC .......................... H01R 13/6397; H01R 13/639
See application file for complete search history.

(56) References Cited

U.S. PATENT DOCUMENTS

| | | | |
|---|---|---|---|
| 6,389,853 B1 * | 5/2002 | Pate ...................... | E05B 45/005 340/432 |
| 6,971,255 B2 | 12/2005 | Bhogal et al. | |
| 7,160,137 B1 * | 1/2007 | Yeh .................... | H01R 13/6397 439/358 |
| 8,578,072 B2 | 11/2013 | Dimatteo, III et al. | |
| 8,684,760 B1 | 4/2014 | Lam et al. | |
| 8,837,144 B1 | 9/2014 | Allen | |
| 8,842,422 B2 | 9/2014 | Hung et al. | |
| 8,845,356 B2 | 9/2014 | Cheatham et al. | |
| 8,967,577 B2 | 3/2015 | Jeansonne et al. | |
| 2005/0039502 A1 * | 2/2005 | Avganim ................ | G06F 21/32 70/58 |
| 2005/0157460 A1 * | 7/2005 | Bhogal ............... | E05B 73/0005 361/679.55 |
| 2008/0110217 A1 | 5/2008 | Andrews | |
| 2012/0118031 A1 * | 5/2012 | Hung .................. | E05B 73/0082 70/279.1 |
| 2012/0262860 A1 * | 10/2012 | Seibert ................. | H05K 5/0217 361/679.02 |
| 2013/0196530 A1 * | 8/2013 | Cheatham .............. | H01R 13/62 439/357 |
| 2014/0109630 A1 * | 4/2014 | Tao ......................... | E05B 37/12 70/15 |

* cited by examiner

*Primary Examiner* — Briggitte R Hammond
(74) *Attorney, Agent, or Firm* — Cantor Colburn LLP; Damion Josephs

(57) ABSTRACT

A power adapter is provided for a computer including a power port and a housing defining an aperture. The power adapter includes a power head, a lock head disposed on the power head and a main housing including a body affixed to a security element, wiring for supplying power to the computer extending through the body to the power head and a lock system selectively actuatable with a key to orient the lock head in first and second orientations. The first orientation is characterized in that the power head is movable relative to the aperture for power head insertion into and removal from the power port. The second orientation is characterized in that the power head is immovable relative to the aperture.

20 Claims, 4 Drawing Sheets

FIG. 1
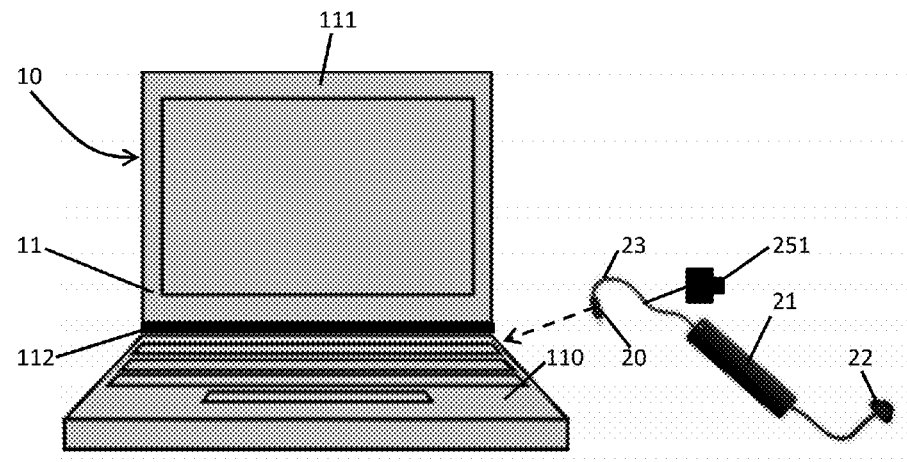
FIG. 2
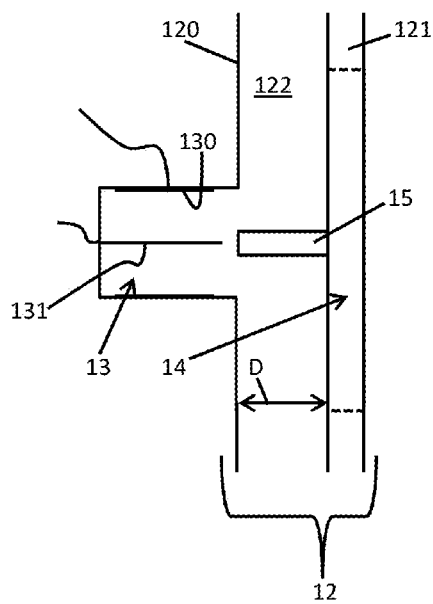
FIG. 3

NOTEBOOK, LAPTOP OR PORTABLE COMPUTER POWER ADAPTER WITH SECURITY LOCK

BACKGROUND

The present invention relates to power adapters and, more specifically, to power adapters with safety security locks for notebooks, laptops or portable computers.

Users often have a need to use portable computers, such as smartphones, tablets and laptop computers, when they move from place to place or travel. In these cases, the users need to periodically charge their computers and take caution to insure that they are not stolen. Typically, portable computers, such as laptops, are charged by plugging them into a wall socket using a power adapter and leaving them in that condition for a given period of time during which the computer battery recharges. Meanwhile, portable computers may be secured or prevented from being stolen by way of flexible computer locks that attach to both the portable computer and a nearby fixed item.

The need for users to plug in their portable computers and secure them in separate operations may, in some circumstances, lead to the users ignoring at least one of the actions. Since users are primarily concerned with using their portable computers, security is often skipped or ignored. This leads to an unsafe condition in which portable computers can be stolen and the data stored thereon stolen or lost.

SUMMARY

According to an embodiment of the present invention, a power adapter is provided for a computer including a power port and a housing defining an aperture. The power adapter includes a power head, a lock head disposed on the power head and a main housing including a body affixed to a security element, wiring for supplying power to the computer extending through the body to the power head and a lock system selectively actuatable with a key to orient the lock head in first and second orientations. The first orientation is characterized in that the power head is movable relative to the aperture for power head insertion into and removal from the power port. The second orientation is characterized in that the power head is immovable relative to the aperture. The present invention relates to power adapters and, more specifically, to power adapters with safety security locks for notebooks, laptops or portable computers.

According to another embodiment of the present invention, a power adapter is provided for a computer including a power port and a housing defining an aperture. The power adapter includes a main housing affixed to a security element, a key housing securely rotatable relative to the main housing to assume first and second rotational positions, a power head insertable into the power port and rotatably coupled to the main housing to be rotated relative to the main housing with the key housing, wiring configured to supply power to the computer extending into and through the main housing to the power head and a lock head. The lock head is disposed on the power head and configured to assume first and second orientations respectively associated with the first and second rotational positions of the key housing and to permit or prevent power head movements relative to the power port in the first and second orientations, respectively.

According to another embodiment of the present invention, a computer is provided and includes an inner housing formed to define a power port, an outer housing formed to define an aperture proximate to the power port and a power adapter. The power adapter includes a power head, a lock head disposed on the power head and a main housing. The main housing includes a body affixed to a security element, wiring for supplying power to the computer extending through the body to the power head and a lock system. The lock system is selectively actuatable with a key to orient the lock head in first and second orientations. The first orientation is characterized in that the power head is movable relative to the aperture for power head insertion into and removal from the power port. The second orientation is characterized in that the power head is immovable relative to the aperture.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 1 is an illustration of a portable laptop computer in accordance with embodiments;

FIG. 2 is a top-down view of a portion of the portable laptop computer of FIG. 1 including a power port;

FIG. 3 is a side view of the portion of the portable laptop computer of FIGS. 1 and 2 including the power port;

DETAILED DESCRIPTION

Figure 4:
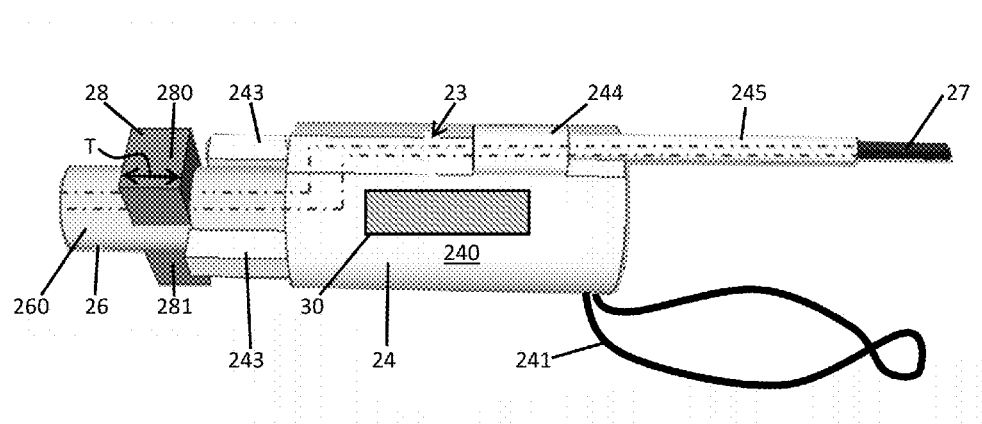
FIG. 4 is a perspective view of a power adapter in accordance with embodiments.
Figure 5:
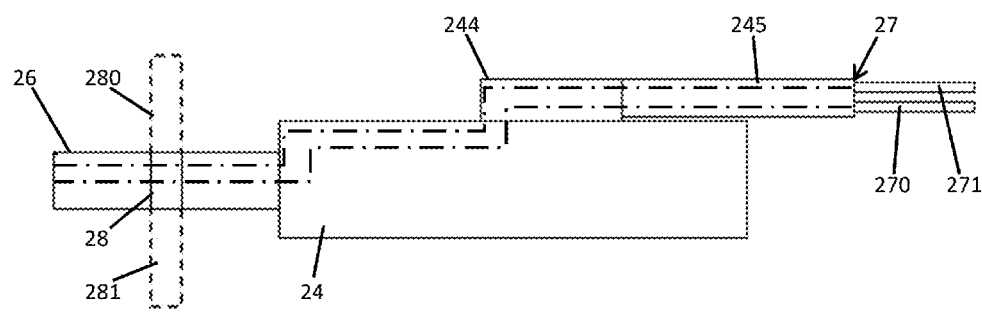
FIG. 5 is a side view of the power adapter of FIG. 4.

As will be described below, a power adapter for a portable computing device, such as a laptop computer, is provided as a single unit that fulfills multiple functions at the same time. The power adapter serves to provide power to the portable computing device and locks the portable computing device. Thus, a user does not need to execute both functions himself.

With reference to FIGS. 1-3, a computer 10 is provided. The computer 10 may be configured as a portable computer and may be particularly configured as a tablet, a smartphone or a laptop computer 11 as shown in FIG. 1. For purposes of clarity and brevity, the following description will relate to the case where the computer 10 is configured as the laptop computer 11. It is to be understood, however, that this is not meant to otherwise limit or narrow the scope of the description and that other suitable configurations are possible.

The laptop computer 11 includes a base 110, a display portion 111 and a hinge 112. The base 110 includes a housing 12 that is supportive of user input elements, such as a keyboard, a mouse pad and right- and left-click buttons, and which encompasses electrical components, such as a central processing unit (CPU), a memory unit, a hard drive and a networking unit. The display portion 111 has a screen by which graphical user interfaces are displayable to the user and the hinge 112 allows the display unit 111 to fold over a top surface of the base 110 to close the laptop computer 11.

As shown in FIGS. 2 and 3, the housing 12 includes an inner housing 120 and an outer housing 121 at least near a rear corner of the base 110 proximate to the hinge 112. The inner housing 120 is formed to define a power port 13 by which the laptop computer 11 is receptive of power in the form of alternating current (AC). The power port 13 may, in some cases, have a generally cylindrical cross-sectional shape. However, it is to be understood that this is not required in all cases and that the power port 13 may have a polygonal or rectangular shape as well. In any case, the power port 13 is provided as a recess within the inner housing 120 from an exterior facing surface thereof and includes an outer conductor 130 and an inner conductor 131 disposed within the outer conductor 130. The outer housing 121 is disposed at a distance D from the inner housing 120 to define a space 122 between the exterior facing surface of the inner housing 120 and an interior facing surface of the outer housing 121. The outer housing 121 is formed to define an aperture 14, which may be substantially aligned with a longitudinal axis of the power port 13. The aperture 14 may have a polygonal or rectangular shape with a minor axis that may be slightly longer than the diameter of the power port 13 and a major axis that may be substantially longer than the diameter of the power port 13.

The laptop computer 11 may further include a sensor 15 disposed on the interior facing surface of the outer housing 121 at a location proximate to the aperture 14. An operation of the sensor 15 will be described in greater detail below, however, it may be understood that the sensor 15 can serve as a tool for sensing a position (rotational or otherwise) of an object, such as the lock head 28 to be described below) and, in some cases, may also serve as a mechanical stopper for that object. In accordance with embodiments, the sensor 15 may have an elongate body extending at least partially from the interior facing surface of the outer housing 121 to the exterior facing surface of the inner housing 120.

With continued reference to FIG. 1 and with additional reference to FIGS. 4-7, a power adapter 20 may be provided for the laptop computer 11 such that power in the form of AC can be supplied to the laptop computer 11. The power adapter 20 includes a flexible cord portion 21 that is made up of a live current wire and a naught wire, a socket portion 22 at a first end of the cord portion 21 and a head portion 23 at a second end of the cord portion 21. The socket portion 22 is pluggable into a wall socket and the head portion 23 is pluggable into the laptop computer 11. The power adapter 20 may further include additional components such as surge protectors for protecting the electrical components of the laptop computer 11.

At the head portion 23, the power adapter 20 includes a main housing 24, a key housing 25, a power head 26, wiring 27 and a lock head 28. The main housing 24 is provided as a body 240 that may be tubular in shape, for example, which is affixed to a security element, such as a garrote wire 241 that may be looped around a fixed item. The fixed item may be a desk, a wall mounted hook or another suitable immovable element. Where the security element is a garrote wire 241, the garrote wire 241 may be looped through a throughhole defined by the body 240 of the main housing 24. The main housing 24 may further include first and second lateral protrusions 243 that extend in substantially similar and parallel directions from a first axial face of the body 240 that faces the laptop computer 11 during power supply operations.

In accordance with embodiments, the power adapter 20 may further include a user identification element 30. The user identification element 30 may be disposed on the main housing 24 or on another suitable surface of the power adapter 20. The user identification element 30 may be provided as a fingerprint scanner, a voice recognition microphone or another suitable device for facilitating identification of a user. In operation, the user identification element 30 may serve to permit activation of the power adapter 20 or the laptop computer 11 only upon validation that a current user is an authorized user. The user identification element 30 may be coupled with the CPU of the laptop computer 11 or independently operable.

Figure 6:
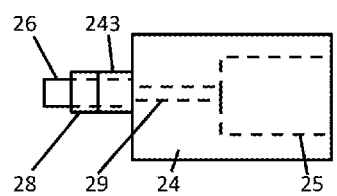
FIG. 6 is a top-down schematic illustration of components of the power adapter of FIG. 4 in accordance with embodiments.
Figure 7:
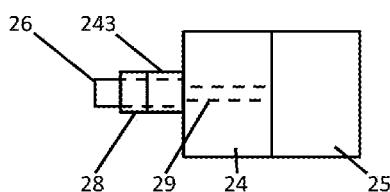
FIG. 7 is a top-down schematic illustration of components of the power adapter of FIG. 4 in accordance with alternative embodiments.
Figure 8A:
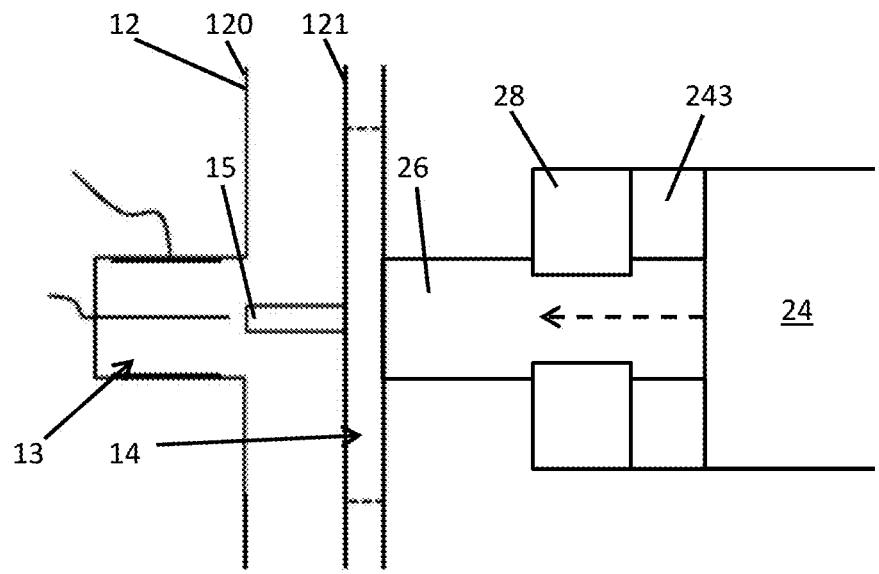
FIG. 8A is a top-down view of a power head of the power adapter approaching the power port of the portable laptop computer of FIGS. 1 and 2.
Figure 8B:
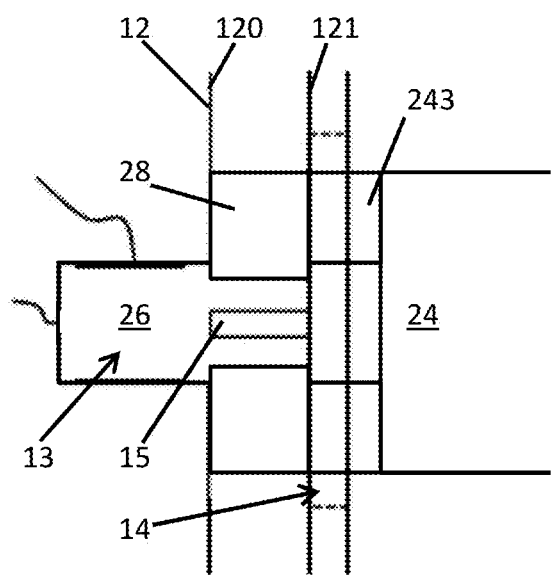
FIG. 8B is a top-down view of the power head being inserted into the power port of the portable laptop computer of FIGS. 1 and 2.
Figure 8C:
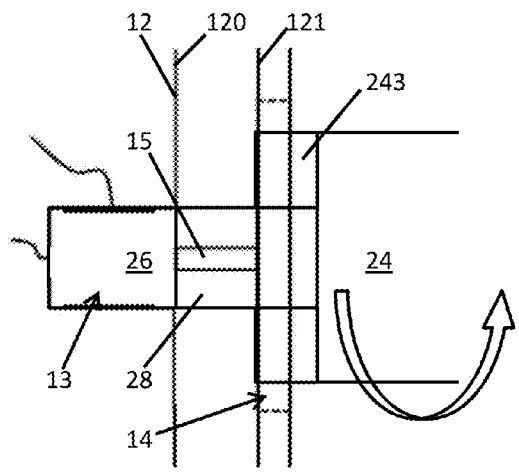
FIG. 8C is a top-down view of a lock head of the power adapter locking the power head in place.
Figure 9A:
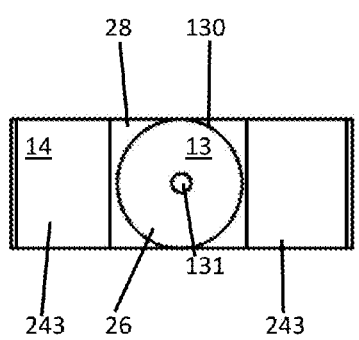
FIG. 9A is a side view of the power head being inserted into the power port of the portable laptop computer of FIGS. 1 and 2.
Figure 9B:
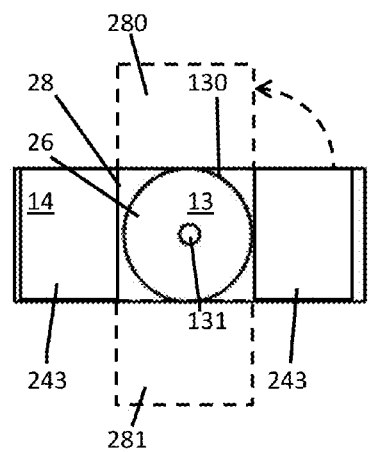
FIG. 9B is a side view of the lock head locking the power head in place.

The key housing 25 is selectively and securely rotatable relative to the main housing 24 to assume at least one of a first rotational position and a second rotational position. As shown in FIG. 6, the key housing 25 may be rotatably disposed within an annular recess defined by the main housing 24 such that a second axial face of the body 240 of the main housing 24 and a corresponding axial face of the key housing 25 align with each other. Alternatively, as shown in FIG. 7, the key housing 25 may be rotatably disposed adjacent to the main housing 24 such that the second axial face of the body 240 of the main housing 24 and the complementary axial face of the key housing 25 abut with one another. In any case, the key housing 25 is formed to define a key hole that is uniquely receptive of a single type of key 251, which may be attachable to the cord portion 21 of the power adapter 20, for example (see FIG. 1). The key housing 25 is exclusively rotatable about a longitudinal axis of the main housing 24 and the key housing 25 by a rotation of the key 251 to thereby assume the at least one of first and second rotational positions.

The power head 26 is removably insertable into the power port 13 and may have a complementary shape with respect to that of the power port 13. Thus, where the power port 13 is cylindrical, the power head 26 may include a tubular body 260 that has a substantially cylindrical shape, which is sized to fit tightly in the power port 13, as well as an outer conductor, an inner conductor disposed within the outer conductor and dielectric material insulating the inner conductor from the outer conductor. In these or other cases, the power head 26 may have a first end that is insertable into the power port 13 and a second end that is rotatably coupled with the first axial face of the body 240 of the main housing 24. As shown in FIGS. 6 and 7, either the power head 26 or the key housing 25 may include a connector 29 that extends through the main housing 24 to thereby connect the power head 26 and the key housing 25. Thus, while the key housing 25 and the power head 26 are both rotatable relative to the main housing 24, the key housing 25 and the power head 26 rotate with each other when the key housing 25 is selectively and securely rotated by the key 251.

In accordance with embodiments, the complementary cylindrical shapes of the power head 26 and the power port 13 permit the power head 26 to be rotated about the central longitudinal axis of the power port 13. Additionally, the power head 26 may be configured such that, as the power head 26 rotates with the key housing 25, the outer and inner conductors of the power head 26 remain in electrical contact with the corresponding conductors of the power port 13. Thus, power may be continually supplied to the laptop computer 11 once the power head 26 is inserted into the power port 13 and while the power head 26 rotates within the power port 13.

The wiring 27 is configured to supply power in the form of the AC to the laptop computer 11 and extends into and through the main housing 24 to the power head 26. In particular, the wiring 27 may include live current wiring 270 and naught wiring 271 in correspondence with the live current wire and the naught wire of the cord portion 21.

In accordance with embodiments, the body 240 of the main housing 24 may include a boss 244 at an upper portion thereof as well as an elongate member 245 that extends aftwardly from the boss 244. The live current wire and the naught wire of the cord portion 21 may be electrically coupled to the live current wiring 270 and the naught wiring 271, respectively, at an aft end of the elongate member 245 whereupon the live current wiring 270 and the naught wiring 271 run forwardly through the main housing 24, radially at a forward end of the main housing 24 proximate to the first axial face and then through the power head 26 to be electrically coupled with one of the outer and inner conductors.

The lock head 28 is disposed on the power head 26. In accordance with embodiments, the lock head 28 may be integrally connected to the power head 26 such that, as the power head 26 rotates with the key housing 25, the lock head 28 rotates with the power head 26. In any case, the lock head 28 includes first portion 280 and second portion 281. The first portion 280 extends radially outwardly from a first side of the power head 26 and may have a concave inward end with an angular outward end. The second portion 281 extends radially outwardly from a second side of the power head and may have a concave inward end with an angular outward end. Thus, a cross-sectional shape of the lock head 28 as a whole may be generally rectangular, for example.

With the configuration described above, the lock head 28 may assume at least one of a first orientation and a second orientation. The first orientation of the lock head 28 is associated with an unlocked condition and the first rotational position of the key housing 25 and the corresponding rotational position of the power head 26. The second orientation of the lock head 28 is associated with a locked condition and the second rotational position of the key housing 25 and the corresponding rotational position of the power head 26. As will be described below, when the lock head 28 assumes the first orientation, the lock head permits movements of the power head 26 relative to the power port 13. That is, with the lock head 28 in the first orientation, the lock head 28 is disposed to pass through the aperture 14 such that the power head 26 is permitted to move through the aperture 14 in a forward direction to insertably engage with the power port 13 or in a reverse direction to removably disengage from the power port 13. Conversely, with the lock head 28 in the second orientation, the lock head 28 is disposed to interfere with the outer housing 121 such that the power head 26 is prevented from moving through the aperture 14 in either the forward or reverse directions. As such, with the lock head 28 in the second orientation and the power head 26 inserted into the power port 13, removal of the power head 26 from the power port 13 is prevented.

In accordance with embodiments, the lock head 28 may have an exemplary thickness T (see FIG. 4), which is substantially similar to or narrower than the exemplary distance D (see FIG. 2) between the exterior facing surface of the inner housing 120 and the exterior facing surface of the outer housing 121. In addition, at least one of the first and second portions 280 and 281 of the lock head 28 may have sufficient length such that the at least one of the first and second portions 280 and 281 extends to or near to the sensor 15 of the laptop computer 11 such that the sensor 15 is able to sense its position as part of a determination that the lock head 28 is properly disposed in the locked condition.

With reference to FIGS. 8A through 9B, an operation of the power adapter 20 will now be described.

At an initial stage, the socket portion 22 of the power adapter 20 is plugged into a wall socket and the head portion 23 is positioned proximate to the power port 13. At this point, it is assumed that the key housing 25, the power head 26 and the lock head 28 are rotationally disposed with the lock head 28 in the unlocked condition such that the power head 26, the lock head 28 and the first and second lateral protrusions 243 are disposed to pass through the aperture 14 until the power head 26 becomes inserted into the power port 13.

With the power head 26 then inserted into the power port 13, the lock head 28 will have cleared the aperture 14 but the first and second lateral protrusions 243 will remain slotted in the aperture 14. The single key 251 is subsequently inserted into the key hole of the key housing 25 such that the key housing 25, the power head 26 and the lock head 28 can be rotated relative to the main housing 24. The main housing 24 is rotationally fixed due to the mechanical interference between the first and second lateral protrusions 243 and the sidewalls of the aperture 14. The power head 26 remains inserted in the power port 13 during the rotation but the lock head 28 rotates from the first orientation to the second orientation. Once the lock head 28 reaches the second orientation, the lock head 28 is misaligned with the aperture 14 and the power adapter 20 will be prevented from being drawn away from the power port 13 by the mechanical interference between the lock head 28 and the interior surface of the outer housing 121. The sensor 15 may be employed at this stage to determine whether the lock head 28 has been fully disposed in the second orientation or if further rotation of the key housing 25, the power head 26 and the lock head 28 is needed or advisable.

When the power head 26 is inserted into the power port 13 and the lock head 28 is disposed in the second orientation, the power adapter 20 is effectively locked in place and the laptop computer 11 as a whole is similarly locked by the main housing 24 being affixed to the security element (i.e., the exemplary garrote wire 241 being looped around a fixed item).

Withdrawal of the power adapter 20 can be executed in the reverse order from what is described above. That is, the key housing 25 can be un-rotated from the second rotational position to the first rotational position such that the power head 26 and the lock head 28 are correspondingly rotated. Once the lock head 28 reaches the first orientation, it is re-aligned with the aperture 14 such that the first and second lateral protrusions 243, the lock head 28 and the power head 26 can be drawn away from the power port 13 and thus moved through the aperture 14.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A power adapter for a computer including a power port and a housing defining an aperture, the power adapter comprising:
   a power head;
   a lock head disposed on the power head; and
   a main housing including a body affixed to a security element, wiring for supplying power to the computer extending through the body to the power head and a lock system selectively actuatable with a key to orient the lock head in:
   a first orientation characterized in that the power head is movable relative to the aperture for power head insertion into and removal from the power port, and
   a second orientation characterized in that the power head is immovable relative to the aperture.

2. The power adapter according to claim 1, wherein the main housing comprises a tubular body and lateral protrusions extending from the tubular body.

3. The power adapter according to claim 1, wherein the power head comprises a tubular body.

4. The power adapter according to claim 1, wherein the lock head is integrally coupled to the power head and has a rectangular cross-sectional shape.

5. The power adapter according to claim 1, further comprising a user identification element disposed on the main housing.

6. A power adapter for a computer including a power port and a housing defining an aperture, the power adapter comprising:
   a main housing affixed to a security element;
   a key housing securely rotatable relative to the main housing to assume first and second rotational positions;
   a power head insertable into the power port and rotatably coupled to the main housing to be rotated relative to the main housing with the key housing;
   wiring configured to supply power to the computer extending into and through the main housing to the power head; and
   a lock head disposed on the power head and configured to assume first and second orientations respectively associated with the first and second rotational positions of the key housing and to permit or prevent power head movements relative to the power port in the first and second orientations, respectively.

7. The power adapter according to claim 6, wherein the main housing comprises a tubular body and lateral protrusions extending from the tubular body.

8. The power adapter according to claim 6, wherein the key housing is receptive of and rotatable by a key.

9. The power adapter according to claim 6, wherein the key housing is disposed within a recess defined by the main housing.

10. The power adapter according to claim 6, wherein the key housing is disposed adjacent to the main housing.

11. The power adapter according to claim 6, wherein the power head comprises a tubular body.

12. The power adapter according to claim 6, wherein the lock head is integrally coupled to the power head and has a rectangular cross-sectional shape.

13. The power adapter according to claim 6, further comprising a user identification element disposed on the main housing.

14. A computer, comprising:
    an inner housing formed to define a power port;
    an outer housing formed to define an aperture proximate to the power port;
    a power adapter comprising a power head, a lock head disposed on the power head and a main housing including a body affixed to a security element, wiring for supplying power to the computer extending through the body to the power head and a lock system selectively actuatable with a key to orient the lock head in:
    a first orientation characterized in that the power head is movable relative to the aperture for power head insertion into and removal from the power port, and
    a second orientation characterized in that the power head is immovable relative to the aperture.

15. The computer according to claim 14, wherein the computer is provided as a notebook, laptop or portable computer.

16. The computer according to claim 14, wherein:
    the power port and the power head have complementary cylindrical shapes, and
    the aperture and the lock head have complementary rectangular shapes.

17. The computer according to claim 16, wherein the aperture is aligned with a longitudinal axis of the power port.

18. The computer according to claim 16, wherein a thickness of the lock head is substantially similar to a distance between the inner and outer housings.

19. The computer according to claim 14, further comprising a sensor disposed on the outer housing to determine a lock head orientation.

20. The computer according to claim 14, further comprising a user identification element disposed on the main housing.

* * * * *